United States Patent
Parrish et al.

(10) Patent No.: US 7,638,474 B1
(45) Date of Patent: Dec. 29, 2009

(54) NATURAL LAUNDRY DETERGENT COMPOSITIONS

(75) Inventors: Bryan Parrish, Pleasanton, CA (US); Sumi Cate, Oakland, CA (US); Sarah Coulter, Pleasanton, CA (US); Aram Garabedian, Fremont, CA (US); Michael Ott, Oakland, CA (US); James Siacunco, Dublin, CA (US); Alex Tipton, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 0 days.

(21) Appl. No.: 12/185,975

(22) Filed: Aug. 5, 2008

(51) Int. Cl.
*C11D 17/00* (2006.01)
*C11D 3/395* (2006.01)
*C01B 15/00* (2006.01)
*C01B 15/12* (2006.01)

(52) U.S. Cl. .................. 510/276; 510/302; 510/309; 510/376; 510/375; 510/378; 510/495; 252/186.27; 252/186.3; 252/186.43; 252/186.28

(58) Field of Classification Search ................ 510/276, 510/302, 309, 367, 375, 378, 470, 495; 252/186.27, 252/186.3, 186.43, 186.28
See application file for complete search history.

(56) References Cited

U.S. PATENT DOCUMENTS

| | | | |
|---|---|---|---|
| 3,606,990 A * | 9/1971 | Gobert et al. ............ 8/111 |
| 3,953,350 A * | 4/1976 | Fujino et al. ............ 510/298 |
| 4,071,462 A * | 1/1978 | Matsunaga et al. ...... 252/186.32 |
| 5,395,543 A * | 3/1995 | Johansson et al. ....... 510/229 |
| 5,705,466 A | 1/1998 | Baillely |
| 5,773,399 A | 6/1998 | Baillely |
| 5,792,738 A | 8/1998 | Baillely |
| 5,891,837 A | 4/1999 | Baillely |
| 6,017,867 A | 1/2000 | Baillely |
| 6,150,322 A | 11/2000 | Singleton |
| 6,218,352 B1 * | 4/2001 | Lee et al. ............ 510/375 |
| 6,306,811 B1 | 10/2001 | James |
| 6,391,846 B1 | 5/2002 | Berthod |
| 6,455,490 B1 | 9/2002 | Berthod |
| 6,551,983 B1 | 4/2003 | Welch |
| 7,368,418 B2 | 5/2008 | Diamond |
| 2002/0091070 A1 | 7/2002 | Engisch |
| 2003/0126689 A1 | 7/2003 | Arredondo |
| 2005/0170986 A1 * | 8/2005 | Diamond et al. ............ 510/375 |
| 2007/0037726 A1 | 2/2007 | Brooker |
| 2007/0275243 A1 | 11/2007 | Sontgerath |

FOREIGN PATENT DOCUMENTS

| EP | 0651050 A * | 5/1995 |
|---|---|---|
| JP | 02238098 A * | 9/1990 |
| JP | 04103698 A * | 4/1992 |
| WO | WO 94924238 | 10/1994 |
| WO | WO 95005444 | 2/1995 |
| WO | WO 97019163 | 5/1997 |
| WO | WO 01018165 | 3/2001 |

* cited by examiner

*Primary Examiner*—Lorna M Douyon
(74) *Attorney, Agent, or Firm*—Alok Goel

(57) ABSTRACT

A laundry detergent composition with a limited number of natural ingredients containing a hydrogen peroxide source, sodium carbonate and a surfactant selected from a fatty alcohol sulfate, alkyl polyglucoside and a lauryl sarcosinate. The laundry composition optionally has a fragrance, colored speckles, builder and enzymes. The laundry detergent composition can be used to clean tough stains on fabrics and cleans as well or better than commercial compositions containing synthetically derived cleaning agents.

13 Claims, No Drawings

NATURAL LAUNDRY DETERGENT COMPOSITIONS

BACKGROUND OF THE INVENTION

1. Field of the Invention

The present invention relates generally to natural solid, laundry detergent compositions. The composition comes primarily from renewable sources, has a limited number of ingredients and has good cleaning properties.

2. Description of the Related Art

Laundry detergent compositions have progressed and created a large chemical industry devoted to developing new synthetic surfactants to achieve ever improving laundry detergent compositions for the consumer. Because of a desire to use renewable resources, natural based laundry detergent compositions are gaining increasing interest. Most of these laundry detergent compositions contain only some natural ingredients. Most of these laundry detergent compositions do not have a majority of their components made of natural ingredients. One difficulty in formulating natural based laundry detergent compositions is achieving acceptable consumer performance with a limited number of natural components compared to highly developed formulations using synthetic surfactants and other synthetic ingredients.

Typical cleaning formulations require multiple surfactants, solvents, and builder combinations to achieve adequate consumer performance. For example, U.S. Pat. No. 6,551,983 to Welch et al. discloses a solid detergent composition comprising a bleach-sensitive component and a hydrogen peroxide source and examples include synthetic surfactants and bleach activators. U.S. Pat. No. 5,792,738 to Baillely et al. discloses a granular silicate-built, phosphate free, laundry detergent composition comprising alkali metal percarbonate particles of mean particle diameter below 450 microns and examples include synthetic surfactants and bleach activators. U.S. Pat. No. 5,891,837 to Baillely et al. discloses a particulate laundry detergent composition and synthetic activators, bleach activators and additional builders. U.S. Pat. No. 4,806,273 to Barone et al. which discloses laundry bars that contain high weight percentage of fatty alcohol sulfate but fails to a) disclose a peroxide source or b) a low weight percentage of fatty alcohol sulfate.

Prior art compositions do not combine effective laundry detergent compositions with a minimum number of ingredients, especially with natural ingredients. Prior art laundry detergent compositions do not have at least 95% of the components of the product derived from natural sources such as plant and mineral based materials. Moreover, prior art laundry detergent compositions do not have at least 99% of the components of the product derived from natural sources such as plant and mineral based materials. It is therefore an object of the present invention to provide a laundry detergent compositions that overcomes the disadvantages and shortcomings associated with prior art laundry detergent compositions.

SUMMARY OF THE INVENTION

In accordance with the above objects and those that will be mentioned and will become apparent below, one aspect of the present invention comprises a solid, laundry detergent composition comprising: a. greater than 60% of a hydrogen peroxide source selected from the group consisting of sodium percarbonate, sodium perborate and mixtures thereof; b. less than 30% of sodium carbonate; c. 0.1 to 10% of a surfactant selected from the group consisting of a fatty alcohol sulfate, an alkyl polyglucoside, a lauryl sarcosinate and mixtures thereof, and d. wherein said composition contains no additional surfactant, no additional bleaching activator, no additional organic acid, no additional builder, no additional brightener and no additional preservative.

In accordance with the above objects and those that will be mentioned and will become apparent below, another aspect of the present invention comprises a solid, laundry detergent composition comprising: a. greater than 75% of a sodium percarbonate; b. less than 20% of sodium carbonate; c. 0.1 to 10% of a surfactant selected from the group consisting of a fatty alcohol sulfate, an alkyl polyglucoside, a fatty alcohol sarcosinate and mixtures thereof; and d. wherein said composition contains no additional surfactant, no additional bleaching activator, no additional organic acid.

In accordance with the above objects and those that will be mentioned and will become apparent below, another aspect of the present invention comprises a solid, laundry detergent composition consisting essentially of: a. greater than 75% of a sodium percarbonate; b. less than 20% of sodium carbonate; c. 0.001 to 0.50% fragrance; d. optionally 0.1 to 10% of a C12-C18 fatty alcohol sulfate; e. optionally 0.1-3.0% colored speckle and/or enzyme.

Further features and advantages of the present invention will become apparent to those of ordinary skill in the art in view of the detailed description of preferred embodiments below, when considered together with the attached claims.

DETAILED DESCRIPTION OF THE INVENTION

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

In the application, effective amounts are generally those amounts listed as the ranges or levels of ingredients in the descriptions, which follow hereto. Unless otherwise stated, amounts listed in percentage ("%'s") are in weight percent (based on 100% active) of the cleaning composition alone, not accounting for the substrate weight. Each of the noted cleaner composition components and substrates is discussed in detail below. Additionally, this application also covers methods steps of utilizing the compositions described in the present invention.

The term "comprising", which is synonymous with "including," "containing," or "characterized by," is inclusive or open-ended and does not exclude additional, unrecited elements or method steps. See MPEP 2111.03. See, e.g.,

*Mars Inc.* v. *H.J. Heinz Co.*, 377 F.3d 1369, 1376, 71 USPQ2d 1837, 1843 (Fed. Cir. 2004) ("like the term 'comprising,' the terms 'containing' and 'mixture' are open-ended."). *Invitrogen Corp.* v. *Biocrest Mfg., L.P.*, 327 F.3d 1364, 1368, 66 USPQ2d 1631, 1634 (Fed. Cir. 2003) ("The transition 'comprising' in a method claim indicates that the claim is open-ended and allows for additional steps."); *Genentech, Inc.* v. *Chiron Corp.*, 112 F.3d 495, 501, 42 USPQ2d 1608, 1613 (Fed. Cir. 1997) See MPEP 2111.03. ("Comprising" is a term of art used in claim language which means that the named elements are essential, but other elements may be added and still form a construct within the scope of the claim.); *Moleculon Research Corp.* v. *CBS, Inc.*, 793 F.2d 1261, 229 USPQ 805 (Fed. Cir. 1986); *In re Baxter*, 656 F.2d 679, 686, 210 USPQ 795, 803 (CCPA 1981); *Ex parte Davis*, 80 USPQ 448, 450 (Bd. App. 1948). See MPEP 2111.03.

The term "consisting essentially of" as used herein, limits the scope of a claim to the specified materials or steps "and those that do not materially affect the basic and novel characteristic(s)" of the claimed invention. *In re Herz*, 537 F.2d 549, 551-52, 190 USPQ 461, 463 (CCPA 1976) (emphasis in original). See MPEP 2111.03

The term "laundry composition", as used herein, is meant to mean and include a laundry formulation having at least one surfactant.

The term "surfactant", as used herein, is meant to mean and include a substance or compound that reduces surface tension when dissolved in water or water solutions, or that reduces interfacial tension between two liquids, or between a liquid and a solid. The term "surfactant" thus includes anionic, nonionic and/or amphoteric agents. The term "surfactant" is a natural "surfactant" meaning it is derived from a natural source.

The term "natural" as used herein is meant to mean at least 95% of the components of the product are derived from plant and mineral based materials. Also, the "natural" product is biodegradable. Additionally, the "natural" product is minimally toxic to humans and has a LD50>5000 mg/kg. The "natural" product does not contain of any of the following: non-plant based ethoxylated surfactants, linear alkylbenzene sulfonates ("LAS"), ether sulfates surfactants or nonylphenol ethoxylate (NPE).

The term "ecofriendly" as used herein is meant to mean at least 99% of the components of the product are derived from plant and mineral based materials. Also, the "ecofriendly" product is biodegradable. Additionally, the "ecofriendly" product is minimally toxic to humans and has a LD50>5000 mg/kg. The "natural" product does not contain of any of the following: non-plant based ethoxylated surfactants, linear alkylbenzene sulfonates ("LAS"), ether sulfates surfactants or nonylphenol ethoxylate (NPE).

The term "biodegradable" as used herein is meant to mean microbial degradation of carbon containing materials. The "biodegradable" material must be tested under a recognized protocol and with tested methods of established regulatory bodies such as: EPA, EPA-TSCA, OECD, MITI or other similar or equivalent organizations in the US or internationally. Suitable non-limiting examples of test methods for biodegradation include: OECD methods in the 301-305 series. Generally, all "biodegradable" material must meet the following limitations:

a) removal of dissolved organic carbon >70% b) biological oxygen demand (BOD)>60% c) % of BOD of theoretical oxygen demand >60% d) % $CO_2$ evolution of theoretical >60%

Oxidants

Oxidants, when used, include, but are not limited to, peracids, hydrogen peroxide, and/or sources of hydrogen peroxide. According to the present invention, the oxidizing agent may be an oxygen bleach, including a peroxygen, peroxyhydrate or active oxygen generating compound. Suitable peroxygen bleaches for use herein include hydrogen peroxide or sources thereof. As used herein a source of hydrogen peroxide refers to any compound which generates active oxygen when said compound is in contact with water. Suitable water-soluble sources of hydrogen peroxide for use herein include percarbonates, perborates, preformed percarboxylic acids, persilicates, persulphates, organic and inorganic peroxides and/or hydroperoxides.

In one embodiment, hydrogen peroxide is employed as a solid, laundry detergent composition of the present invention. The compositions of the present invention that comprise a peroxygen bleach does not comprise a bleach activator. By "bleach activator", it is meant herein a compound which reacts with peroxygen bleach like hydrogen peroxide to form a peracid. The peracid thus formed constitutes the activated bleach. Bleach activators that are not to be used in the composition include, but are not limited to, those belonging to the class of esters, amides, imides, or anhydrides. Examples of bleach activators that are not to be used in the composition include, but are not limited to, TAED, sodium 3,5,5 trimethyl hexanoyloxybenzene sulphonate, diperoxy dodecanoic acid, nonylamide of peroxyadipic acid, nonylamide of peroxyadipic acid, n-nonanoyloxybenzenesulphonate (NOBS), acetyl triethyl citrate (ATC), n-alkyl alkyl ammonium acetonitrile activators. Examples of bleach activators that are not to be used in the composition include, but are not limited to, are N-acyl caprolactams selected from the group consisting of substituted or unsubstituted benzoyl caprolactam, octanoyl caprolactam, nonanoyl caprolactam, hexanoyl caprolactam, decanoyl caprolactam, undecenoyl caprolactam, formyl caprolactam, acetyl caprolactam, propanoyl caprolactam, butanoyl caprolactam pentanoyl caprolactam or mixtures thereof.

In addition, other classes of peroxides can be used as an alternative to hydrogen peroxide and sources thereof or in combination with hydrogen peroxide and sources thereof. Suitable classes include dialkylperoxides, diacylperoxide, performed percarboxylic acids, organic and inorganic peroxides and/or hydroperoxides. Suitable organic peroxides/hydroperoxides include diacyl and dialkyl peroxides/hydro-peroxides such as dibenzoyl peroxide, t-butyl hydroperoxide, dilauroyl peroxide, dicumyl peroxide, and mixtures thereof. Suitable preformed peroxyacids for use in the compositions according to the present invention include diperoxydodecandioic acid DPDA, magnesium perphthalic acid, perlauric acid, perbenzoic acid, diperoxyazelaic acid and mixtures thereof.

Suitably, the hydrogen peroxide source is present in the laundry composition in an amount ranging from about greater than 50%, greater than 55%, greater than 60%, greater than 65%, greater than 70%, greater than 75%, greater than 80%, greater than 85% and greater than 90%. Suitably, the hydrogen peroxide source is present in the cleaning composition in an amount ranging from about 50 to 95%, 50 to 90%, 50 to 85%, 50 to 80%, 55 to 95%, 55 to 90%, 55 to 85%, 55 to 80%, 60 to 90%, 60 to 85%, 60 to 80%, 65 to 95%, 65 to 90%, 65 to 85%, 65 to 80%, 70 to 95%, 70 to 90%, 70 to 85%, 70 to 80%, 75 to 95%, 75 to 90%, 75 to 85%, 80 to 95%, 80 to 90% and 85% to 95%. In one embodiment, the hydrogen peroxide source is sodium percarbonate. In another embodiment, the hydrogen peroxide source is sodium perborate.

The mean particle size, by weight of the hydrogen peroxide source can be between 400 and 550 microns, 425 and 550 microns, 450 and 550 microns, 475 and 550 microns, 500 and 550 microns 425 and 525 microns, 425 and 500 microns and 450 and 500 microns. The hydrogen peroxide source may be coated or uncoated. If the hydrogen peroxide source is coated, the coating of the hydrogen peroxide source does not contain a water-soluble surfactant on its coating.

Surfactants

The present invention can work with only three types of surfactants: a) fatty alcohol sulfate b) alkyl polyglucoside and c) fatty acid sarcosinate or d) mixtures thereof. These three types of surfactants all come from natural sources. The present invention will not contain additional surfactants and will not work with other surfactants other than three types mentioned in this application. The present invention will not with surfactants that are derived from petrochemicals or synthetic surfactants. Examples of surfactants that will not work the present invention include, but are not limited to, linear alkyl benzene sulfonate ("LAS"), ether sulfates, ethoxylated surfactants and nonylphenol ethoxylate ("NPE"). The surfactant is present in the composition in the ranges of 0.1 to 10%, 0.1 to 9.0%, 0.1 to 8.0%, 0.1 to 7.0%, 0.1 to 6.0%, 0.1 to 5.0%, 0.1 to 4.0%, 0.1 to 3.0%, 0.1 to 2.0%, 1.0 to 9.0%, 1.0 to 5.0%, 1.0 to 3.0%, 3.0 to 10%, 3.0 to 7.0%, 5.0 to 10%, 5.0 to 9.0%, 6.0 to 10%, 7.0 to 10% and 8.0 to 10%. In another embodiment, there is no surfactant in the composition. The surfactant may simply be added to the composition or may be agglomerated with silicate and a filler substance such as carbonate, zeolite or sulfate.

Fatty Alcohol Sulfate

The laundry compositions contain a fatty alcohol sulfate. The fatty alcohol sulfate is one in which the higher alcohol or alkyl group is normally in the range of 10 to 18 carbon atoms. The cation will almost invariably be sodium or will include sodium, although other cations, such as triethanolamine, potassium, ammonium, magnesium and calcium. Preferred fatty alcohol sulfates are those wherein the fatty alcohol is essentially saturated and is of carbon content(s) within the 10 to 18 carbon atoms range, preferably 10 or 12 to 14 or 16 carbon atoms, such as 12 to 16, or that is derived from coconut oil (coco), palm oil, or palm kernel oil. Lauryl sulfates, and particularly, sodium lauryl sulfate, are preferred primary detergents but such designation also may apply to such detergents wherein the carbon chain length of the alcohol is not limited to 12 carbon atoms, but is primarily (over 50% and normally over 70 or 75%) of 12 to 14 carbon atoms. Such materials may be obtained from natural sources, such as coconut oil and palm kernel oil. In one embodiment, the fatty alcohol sulfate is a C12-C18 fatty alcohol sulfate. In another embodiment, the fatty alcohol sulfate is a C12-C16 fatty alcohol sulfate. In another embodiment, the fatty alcohol sulfate is a C12-C14 fatty alcohol sulfate. In another embodiment, the fatty alcohol is a C12 fatty alcohol sulfate. In another embodiment, the fatty alcohol sulfate is sodium lauryl sulfate. In a specific embodiment, the fatty alcohol sulfate is a sodium coco fatty alcohol sulfate.

Alkyl Polyglucoside

The laundry compositions contain alkyl polyglucoside surfactant. The laundry compositions preferably have an absence of other nonionic surfactants, especially synthetic nonionic surfactants, such as ethoxylates. The laundry compositions preferably have an absence of other surfactants, such as anionic, cationic, and amphoteric surfactants. Suitable alkyl polyglucoside surfactants are the alkylpolysaccharides that are disclosed in U.S. Pat. No. 5,776,872 to Giret et al.; U.S. Pat. No. 5,883,059 to Furman et al.; U.S. Pat. No. 5,883,062 to Addison et al.; and U.S. Pat. No. 5,906,973 to Ouzounis et al., which are all incorporated by reference. Suitable alkyl polyglucosides for use herein are also disclosed in U.S. Pat. No. 4,565,647 to Llenado describing alkylpolyglucosides having a hydrophobic group containing from about 6 to about 30 carbon atoms, or from about 10 to about 16 carbon atoms and polysaccharide, e.g., a polyglycoside, hydrophilic group containing from about 1.3 to about 10, or from about 1.3 to about 3, or from about 1.3 to about 2.7 saccharide units. Optionally, there can be a polyalkyleneoxide chain joining the hydrophobic moiety and the polysaccharide moiety. A suitable alkyleneoxide is ethylene oxide. Typical hydrophobic groups include alkyl groups, either saturated or unsaturated, branched or unbranched containing from about 8 to about 18, or from about 10 to about 16, carbon atoms. Suitably, the alkyl group can contain up to about 3 hydroxy groups and/or the polyalkyleneoxide chain can contain up to about 10, or less than about 5, alkyleneoxide moieties. Suitable alkyl polysaccharides are octyl, nonyldecyl, undecyldodecyl, tridecyl, tetradecyl, pentadecyl, hexadecyl, heptadecyl, and octadecyl, di-, tri-, tetra-, penta-, and hexaglucosides, galactosides, lactosides, glucoses, fructosides, fructoses and/or galactoses. Suitable mixtures include coconut alkyl, di-, tri-, tetra-, and pentaglucosides and tallow alkyl tetra-, penta-, and hexaglucosides.

Suitable alkylpolyglycosides (or alkylpolyglucosides) have the formula: $R^2O(C_nH_{2n}O)_t(glucosyl)_x$ wherein $R^2$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is about 2 or about 3, preferably about 2; t is from 0 to about 10, preferably 0; and x is from about 1.3 to about 10, preferably from about 1.3 to about 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominantly the 2-position.

A group of alkyl glycoside surfactants suitable for use in the practice of this invention may be represented by Formula I below:

$$RO-(R^2O)_y-(G)_xZ_b \qquad \text{Formula I}$$

wherein R is a monovalent organic radical containing from about 6 to about 30 (preferably from about 8 to about 18) carbon atoms; $R^2$ is a divalent hydrocarbon radical containing from about 2 to about 4 carbon atoms; 0 is an oxygen atom; y is a number which has an average value from about 0 to about 1 and is preferably 0; G is a moiety derived from a reducing saccharide containing 5 or 6 carbon atoms; and x is a number having an average value from about 1 to 5 (preferably from 1.1 to 2); Z is $O_2M^1$, $O_2CR^3$, $O(CH_2)$, $CO_2M^1$, $OSO_3M^1$, or $O(CH_2)SO_3M^1$; $R^3$ is $(CH_2)CO_2M^1$ or $CH=CHCO_2M^1$; (with the proviso that Z can be $O_2M^1$ only if Z is in place of a primary hydroxyl group in which the primary hydroxyl-bearing carbon atom, $-CH_2OH$, is oxidized to form a $-CO_2M^1$ group); b is a number from 0 to 3x+1 preferably an average of from 0.5 to 2 per glycosal group; p is 1 to 10, $M^1$ is $H^+$ or an organic or inorganic cation, such as, for example, an alkali metal, ammonium, monoethanolamine, or calcium. As defined in Formula I, R is generally the residue of a fatty alcohol having from about 8 to 30 or 8 to 18 carbon atoms. Commercially available preferred alkylglycosides include, but are not limited to, Glucopon 425® (a $C_8$-$C_{16}$ alkyl polyglycoside available from Cognis Corporation), Glucopon 625® (a $C_{12}$-$C_{16}$ alkyl polyglycoside available from Cognis Corporation), Dow Triton® CG-110 (a $C_8$-$C_{10}$ alkyl polyglycoside available from Dow Chemical Company), AG6202® (a $C_8$ alkyl polyglycoside available from Akzo Nobel) and Alkadet 35® (a $C_8$-$C_{10}$ alkyl polyglycoside available from Huntsman Corporation). A C8 to C10 alkylpolyglucoside includes alkylpolyglucosides wherein the alkyl group is substantially C8 alkyl, substantially C10 alkyl, or a mixture of substantially C8 and C10 alkyl. A C6 to C8 alkylpolyglucoside includes alkylpolyglucosides wherein the alkyl group is substantially C6 alkyl, substantially C8 alkyl, or a mixture of substantially C6 and C8 alkyl. In another embodiment, a C6 alkylpolyglucoside can be used in the present invention. An exemplary embodiment of a C6 alkylpolyglucoside is AG 6206® (a $C_6$ alkyl polyglycoside available from Akzo Nobel).

Fatty Acid Sarcosinate

The cleaning compositions contain a fatty acid sarcosinate. The fatty acid sarosinates are mild, biodegradable anionic surfactants derived from fatty acids and sarcosine (amino acid). Sarcosine is the N-methyl derivative of glycine. Sarcosine is a natural amino acid found in muscles and other tissues. Sarcosine is found naturally as an intermediate in the metabolism of choline to glycine. In a preferred embodiment, the sarcosines are acyl sarcosines. Examples of acyl sarcosines include, but are not limited to, cocoyl sarcosine, lauroyl sarcosine, myristoyl sarcosine, oleoyl sarcosine, stearoyl sarcosine which are modified fatty acids. The salts of acyl sarcosines are referred to acyl sarcosinates. Acyl sarcosinates useful herein include, for example, those having a formula:

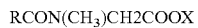

$$RCON(CH_3)CH2COOX$$

wherein R is an alkyl or alkenyl having from 8 to 22 carbon atoms, preferably from 12 to 18 carbon atoms, more preferably from 12 to 14 carbon atoms; and X is a sodium, potassium, ammonium, or triethanolamine.

Examples of acyl sarcosinates that can be used with the present invention include, but not limited to, sodium coccyl sarcosinate, sodium lauroyl sarcosinate and sodium myristoyl sarcosinate, sodium oleoyl sarcosinate, sodium stearoyl sarcosinate, ammonium coccyl sarcosinate, ammonium lauroyl sarcosinate and ammonium myristoyl sarcosinate, ammonium oleoyl sarcosinate and ammonium stearoyl sarcosinate. Commercially available preferred acyl sarcosinates include, but are not limited to, for example, sodium lauroyl sarcosinate having the tradename Hamposyl® L30 which is available from Hampshire Chemicals, and sodium cocoyl sarcosinate having the tradename Hamposyl® C30 which is available from Hampshire Chemicals.

Buffers

The laundry compositions can contain a buffer. Suitably, the buffer is present in the laundry composition in an amount ranging from less than 30%, less than 25%, less than 20%, less than 15%, less than 10% and less than 5%. The buffer is also present in the composition in the following ranges: 5 to 30%, 5 to 25%, 5 to 20%, 5 to 15%, 10 to 30%, 10 to 25%, 10 to 20%, 15 to 30% and 15 to 25% and 20 to 30%. In a most preferred embodiment, the invention comprises only one buffer, carbonate. In other embodiments, additional buffers are present in less than 5% or less than 1% or less than 0.5%.

In another embodiment, the composition contains up to 20% bicarbonate, or up to 10% bicarbonate, or up to 5% bicarbonate.

The buffer is preferably selected from inorganic buffers, such as alkali metal carbonate, alkali metal bicarbonate, alkali metal hydroxide, alkali metal silicate and combinations thereof. In a preferred embodiment, the buffer is sodium carbonate. The compositions should contain essentially no phosphates. The term silicate is meant to encompass silicate, metasilicate, polysilicate, aluminosilicate and similar compounds. These buffers are often obtained from natural sources.

Sequestrants

The laundry composition can include a sequestrant, which increases the effectiveness of the surfactant. The sequestrant can also function as a softener, a buffering agent, or a pH adjusting agent in the laundry composition. A variety of sequestrants can be used and they include, but are not limited to, ammonium and substituted ammonium polyacetates, trialkali salts of nitrilotriacetic acid, carboxylates, polycarboxylates, polyphosphates, aminopolycarboxylates, polyhydroxy-sulfonates, and starch derivatives. Sequestrants, when used, include, but are not limited to, carbamate, phosphate, polyphosphate, pyrophosphates, triphosphates, tetraphosphates, ammonia, monoethanolamine, monopropanolamine, diethanolamine, dipropanolamine, triethanolamine, and 2-amino-2-methylpropanol. Preferred sequestrants for compositions of this invention are nitrogen-containing materials. Some examples are amino acids such as lysine or lower alcohol amines like mono-, di-, and tri-ethanolamine. Other preferred nitrogen-containing buffering agents are tri(hydroxymethyl)amino methane (TRIS), 2-amino-2-ethyl-1,3-propanediol, 2-amino-2-methyl-propanol, 2-amino-2-methyl-1,3-propanol, disodium glutamate, N-methyl diethanolamide, 2-dimethylamino-2-methylpropanol (DMAMP), 1,3-bis(methylamine)-cyclohexane, 1,3-diamino-propanol N,N'-tetra-methyl-1,3-diamino-2-propanol, N,N-bis(2-hydroxyethyl)glycine (bicine) and N-tris(hydroxymethyl)methyl glycine (tricine). Mixtures of any of the above are also acceptable. In preferred embodiments, the composition contains essentially no sequestrants.

Fragrances and Essential Oils

The laundry compositions of the present invention can contain a fragrance or natural essential oils. In one embodiment, the laundry compositions contain the natural essential oils or fragrances containing d-limonene or lemon oil or d-limonene. Lemon oil or d-limonene helps the performance characteristics of the cleaning composition to allow suitable consumer performance with natural ingredients and a minimum of ingredients. Lemon oil and d-limonene compositions which are useful in the invention include mixtures of terpene hydrocarbons obtained from the essence of oranges, e.g., cold-pressed orange terpenes and orange terpene oil phase ex fruit juice, and the mixture of terpene hydrocarbons expressed from lemons and grapefruit. The essential oils may contain minor, non-essential amounts of hydrocarbon carriers. Suitably, lemon oil, d-limonene, or essential oils containing d-limonene are present in the cleaning composition in an amount ranging from about 0.001 to about 0.50 weight percent, or 0.001 to 0.40 weight percent, or 0.001 to 0.30 weight percent, or 0.001 to 0.25 weight percent, or 0.001 to 0.20 weight percent, or 0.001 to 0.10 weight percent, or 0.002 to 0.40 weight percent, or 0.002 to 0.30 weight percent, or 0.002 to 0.25 weight percent, or 0.002 to 0.20 weight percent, or 0.002 to 0.10 weight percent.

Essential oils include, but are not limited to, those obtained from thyme, lemongrass, citrus, lemons, oranges, anise, clove, aniseed, pine, cinnamon, geranium, roses, mint, lavender, citronella, eucalyptus, peppermint, camphor, sandalwood, rosmarin, vervain, fleagrass, lemongrass, ratanhiae, cedar and mixtures thereof. Preferred essential oils to be used herein are thyme oil, clove oil, cinnamon oil, geranium oil, eucalyptus oil, peppermint oil, mint oil or mixtures thereof.

Actives of essential oils to be used herein include, but are not limited to, thymol (present for example in thyme), eugenol (present for example in cinnamon and clove), menthol (present for example in mint), geraniol (present for example in geranium and rose), verbenone (present for example in vervain), eucalyptol and pinocarvone (present in eucalyptus), cedrol (present for example in cedar), anethol (present for example in anise), carvacrol, hinokitiol, berberine, ferulic acid, cinnamic acid, methyl salicylic acid, methyl salycilate, terpineol and mixtures thereof. Preferred actives of essential oils to be used herein are thymol, eugenol, verbenone, eucalyptol, terpineol, cinnamic acid, methyl salicylic acid, and/or geraniol.

Other essential oils include Anethole 20/21 natural, Aniseed oil china star, Aniseed oil globe brand, Balsam (Peru), Basil oil (India), Black pepper oil, Black pepper oleoresin 40/20, Bois de Rose (Brazil) FOB, Borneol Flakes (China), Camphor oil, Camphor powder synthetic technical, Canaga oil (Java), Cardamom oil, Cassia oil (China), Cedarwood oil (China) BP, Cinnamon bark oil, Cinnamon leaf oil, Citronella oil, Clove bud oil, Clove leaf, Coriander (Russia), Coumarin (China), Cyclamen Aldehyde, Diphenyl oxide, Ethyl vanilin, Eucalyptol, Eucalyptus oil, Eucalyptus citriodora, Fennel oil, Geranium oil, Ginger oil, Ginger oleoresin (India), White grapefruit oil, Guaiacwood oil, Gurjun balsam, Heliotropin, Isobornyl acetate, Isolongifolene, Juniper berry oil, L-methyl acetate, Lavender oil, Lemon oil, Lemongrass oil, Lime oil distilled, Litsea Cubeba oil, Longifolene, Menthol crystals, Methyl cedryl ketone, Methyl chavicol, Methyl salicylate, Musk ambrette, Musk ketone, Musk xylol, Nutmeg oil, Orange oil, Patchouli oil, Peppermint oil, Phenyl ethyl alcohol, Pimento berry oil, Pimento leaf oil, Rosalin, Sandalwood oil, Sandenol, Sage oil, Clary sage, Sassafras oil, Spearmint oil, Spike lavender, Tagetes, Tea tree oil, Vanilin, Vetyver oil (Java), and Wintergreen. Each of these botanical oils is commercially available.

Colorants, Dyes and Enzymes

The laundry compositions can contain dyes, colorants and enzymes. These dyes and colorants can be natural (occurring in nature or slightly processed from natural materials) or synthetic. Dyes and colorants include synthetic dyes such as Liquitint® Yellow or Blue or natural plant dyes, colored speckles or pigments, such as a natural yellow, orange, red, and/or brown pigment, such as carotenoids, including, for example, beta-carotene and lycopene. Colored speckles can be synthetic or natural and can include green metso beads, britasel dyed with Milliken dyes, Blue Metso or UMB. Enzymes used in the laundry composition include, but are not limited to, proteases, amylases, lipases and mixtures thereof. In a preferred embodiment, the colorants, dyes and enzymes cannot be more than 3.0%, no more than 2.0%, no more than 1.0%, and no more than 0.5% in the laundry composition. In another embodiment, the colorants, dyes, enzymes and mixtures thereof can be between 0.1 to 3.0%, 0.1 to 2.0%, 0.1 to 1.0%, 0.5 to 3.0%, 0.5 to 2.0%, 0.5 to 1.0%, 1.0 to 3.0% and 1.0 to 2.0%.

Organic Acids, Brighteners and Preservatives

The laundry compositions do not contain organic acids, brighteners or preservatives. Organic acids include but are not limited to sulfonic acids, acetic acid, formic acid, oxalic acid and 2-hydroxycarboxylic acids. The 2-hydroxycarboxylic acids include, but are not limited to, tartaric acid, citric acid, malic acid, mandelic acid, acetic acid, oxalic acid, glycolic acid and lactic acid. Natural preservatives include benzyl alcohol, potassium sorbate and bisabalol; sodium benzoate and 2-phenoxyethanol. Preservatives, when used, include, but are not limited to, mildewstat or bacteriostat, methyl, ethyl and propyl parabens, short chain organic acids (e.g. acetic, lactic and/or glycolic acids), bisguanidine compounds (e.g. Dantagard® and/or Glydant®) and/or short chain alcohols (e.g. ethanol and/or IPA). The mildewstat or bacteriostat includes, but is not limited to, mildewstats (including non-isothiazolone compounds) including Kathon GC/ICP®, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, all available from Rohm and Haas Company; BRONOPOL®, a 2-bromo-2-nitropropane 1,3 diol, from Boots Company Ltd., PROXEL CRL, a propyl-p-hydroxybenzoate, from ICI PLC; NIPASOL M, an o-phenyl-phenol, $Na^+$ salt, from Nipa Laboratories Ltd., DOWICIDE A, a 1,2-Benzoisothiazolin-3-one, from Dow Chemical Co., and IRGASAN DP 200, a 2,4,4'-trichloro-2-hydroxydiphenylether, from Ciba-Geigy A.G. Brighteners include, but are not limited to optical brighteners, which for example include stillbene-triazinic derivatives.

EXAMPLES

The compositions are simple, natural, high performance laundry formulations with a minimum of essential natural ingredients. Competitive laundry products are either natural and inferior in performance or contain additional ingredients that make them non-natural, such as synthetic components. Because fragrances, dyes and colorants are used in such small amounts, these may be synthetic but the entire composition may still be characterized as natural. Preferably, the compositions contain only natural fragrances, dyes, and colorants, if any.

Table I illustrates natural laundry detergent compositions of the invention.

TABLE I

| Natural Laundry Detergent Composition | A | B | C | D | E | F | G |
|---|---|---|---|---|---|---|---|
| Sodium Percarbonate | 87.00 | 87.00 | 87.00 | 87.00 | 77.00 | 0.00 | 79.00 |
| Sodium Perborate | 0.00 | 0.00 | 0.00 | 0.00 | 0.00 | 69.00 | 0.00 |

TABLE I-continued

| Natural Laundry Detergent Composition | A | B | C | D | E | F | G |
|---|---|---|---|---|---|---|---|
| Sulfopon ® 1216G* | 6.06 | 0.00 | 0.00 | 0.00 | 3.80 | 0.00 | 0.00 |
| Stepanol ® DCFAS-P** | 0.00 | 0.00 | 0.00 | 0.00 | 0.00 | 9.00 | 0.00 |
| Texapon ® K12G*** | 0.00 | 6.06 | 0.00 | 0.00 | 0.00 | 0.00 | 3.50 |
| Stepanol ® ME Dry, Silicate and Sodium Carbonate Filler agglomerated with each other**** | 0.00 | 0.00 | 8.86 | 0.00 | 0.00 | 0.00 | 0.00 |
| Colored Speckle | 1.00 | 1.00 | 1.00 | 1.00 | 0.00 | 2.00 | 0.50 |
| Sodium Carbonate | 5.93 | 5.93 | 3.13 | 11.90 | 19.20 | 19.50 | 16.50 |
| Fragrance | 0.01 | 0.01 | 0.01 | 0.10 | 0.00 | 0.50 | 0.50 |
| Total | 100.00 | 100.00 | 100.00 | 100.00 | 100.00 | 100.00 | 100.00 |

*Sulfopon ® 1216G-Sodium C12-C16 Fatty Alcohol Sulfate
**Stepanol ® DCFAS-P-Sodium Coco C12-C18 Fatty Alcohol Sulfate
***Texapon ® 12KG-Sodium C12 Fatty Alcohol Sulfate (i.e. Sodium Lauryl Sulfate)
****Stepanol ® ME Dry is a Sodium Lauryl Sulfate and this surfactant is agglomerated with silicate and sodium carbonate filler, thereby forming an agglomerated anionic surfactant.

Table II illustrates natural laundry detergent compositions of the invention.

TABLE II

| Natural Laundry Detergent Composition | H | I | J | K | L | M | N |
|---|---|---|---|---|---|---|---|
| Sodium Percarbonate | 0.00 | 89.00 | 87.00 | 87.00 | 86.00 | 83.00 | 86.00 |
| Sodium Perborate | 85.00 | 0.00 | 0.00 | 0.00 | 0.00 | 0.00 | 0.00 |
| Sulfopon ® 1216G* | 0.00 | 0.00 | 0.00 | 0.00 | 3.50 | 3.50 | 0.00 |
| Stepanol ® DCFAS-P** | 0.00 | 7.50 | 0.00 | 0.00 | 0.00 | 0.00 | 0.00 |
| Stepanol ® ME Dry, Silicate and Sodium Carbonate Filler agglomerated with each other*** | 7.00 | 0.00 | 0.00 | 0.00 | 0.00 | 0.00 | 0.00 |
| C8-C10 APG | 0.00 | 0.00 | 5.56 | 0.00 | 3.50 | 0.00 | 3.50 |
| Lauryl Sarcosinate | 0.00 | 0.00 | 0.00 | 7.12 | 0.00 | 3.50 | 3.50 |
| Colored Speckle | 1.00 | 1.0 | 1.0 | 1.0 | 1.0 | 1.0 | 1.0 |
| Sodium Carbonate | 6.90 | 2.0 | 6.43 | 4.87 | 5.99 | 8.99 | 5.99 |
| Fragrance | 0.1 | 0.5 | 0.01 | 0.01 | 0.01 | 0.01 | 0.01 |
| Total | 100.00 | 100.00 | 100.00 | 100.00 | 100.00 | 100.00 | 100.00 |

*Sulfopon ® 1216G-Sodium C12-C16 Fatty Alcohol Sulfate
**Stepanol ® DCFAS-P-Sodium Coco C12-C18 Fatty Alcohol Sulfate
***Stepanol ® ME Dry is a Sodium Lauryl Sulfate and this surfactant is agglomerated with silicate and sodium carbonate filler, thereby forming an agglomerated anionic surfactant.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

We claim:

1. A solid, laundry detergent composition comprising:
   a. greater than 60% of a hydrogen peroxide source selected from the group consisting of sodium percarbonate, sodium perborate and mixtures thereof;
   b. less than 30% of sodium carbonate;
   c. 0.1 to 10% of a fatty alcohol sulfate surfactant agglomerated with a silicate and a second sodium carbonate; and
   d. wherein said composition contains no additional surfactant, no additional bleaching activator, no additional organic acid, no additional builder, no additional brightener, and no additional preservative.

2. The composition of claim 1, wherein the hydrogen peroxide source is sodium percarbonate.

3. The composition of claim 1, wherein the hydrogen peroxide source is greater than 70%.

4. The composition of claim 1, wherein the hydrogen peroxide source is greater than 80%.

5. The composition of claim 1, wherein the fatty alcohol sulfate is a C12 to C18 fatty alcohol sulfate.

6. The composition of claim 1, wherein the fatty alcohol sulfate is a C12 to C16 fatty alcohol sulfate.

7. The composition of claim 1, wherein the fatty alcohol sulfate is a C12 fatty alcohol sulfate.

8. The composition of claim 1, wherein the fatty alcohol sulfate is a sodium coco fatty alcohol sulfate.

9. A solid, laundry detergent composition comprising:
   a. greater than 75% of a sodium percarbonate;
   b. less than 20% of sodium carbonate;
   c. 0.1 to 10% of a fatty alcohol sulfate surfactant agglomerated with a silicate and a second sodium carbonate; and
   d. wherein said composition contains no additional surfactant, no additional bleaching activator and no additional organic acid.

10. The composition of claim 9, wherein the fatty alcohol sulfate is a C12 to C18 fatty alcohol sulfate.

11. The composition of claim 9, wherein the fatty alcohol sulfate is a C12 to C16 fatty alcohol sulfate.

12. The composition of claim 9, wherein the fatty alcohol sulfate is a C12 fatty alcohol sulfate.

13. The composition of claim 9, wherein the fatty alcohol sulfate is a sodium coco fatty alcohol sulfate.

* * * * *